(12) United States Patent
Kowada

(10) Patent No.: US 12,531,652 B2
(45) Date of Patent: Jan. 20, 2026

(54) RECEIVING DEVICE, ABNORMALITY DETECTING METHOD, AND ABNORMALITY DETECTING PROGRAM

(71) Applicant: FURUNO ELECTRIC CO., LTD., Hyogo (JP)

(72) Inventor: Shinya Kowada, Nishinomiya (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 43 days.

(21) Appl. No.: 18/398,024

(22) Filed: Dec. 27, 2023

(65) Prior Publication Data

US 2024/0129061 A1     Apr. 18, 2024

Related U.S. Application Data

(63) Continuation-in-part of application No. PCT/JP2022/010528, filed on Mar. 10, 2022.

(30) Foreign Application Priority Data

Jun. 28, 2021 (JP) ................................ 2021-106850

(51) Int. Cl.
    *H04L 1/00*          (2006.01)
    *H04B 3/46*          (2015.01)

(52) U.S. Cl.
    CPC ............ *H04L 1/004* (2013.01); *H04B 3/46* (2013.01)

(58) Field of Classification Search
    CPC ............ H04L 1/004; H04B 3/46; G01S 19/21
    See application file for complete search history.

(56) References Cited

U.S. PATENT DOCUMENTS

| 10,075,284 | B1 | 9/2018 | Rodrigues et al. |
| 2016/0182217 | A1 | 6/2016 | Hashizume et al. |
| 2019/0379474 | A1 | 12/2019 | Coulter |

FOREIGN PATENT DOCUMENTS

| CN | 101531308 B | * | 9/2011 | |
| CN | 106953633 A | * | 7/2017 | ............... H03B 5/32 |
| CN | 107819540 A | | 3/2018 | |

(Continued)

OTHER PUBLICATIONS

International Search Report issued in PCT/JP2022/010528; mailed Jun. 14, 2022.

(Continued)

*Primary Examiner* — Guerrier Merant
(74) *Attorney, Agent, or Firm* — Studebaker Brackett PLLC

(57) ABSTRACT

The present disclosure proposes a receiving device, an abnormality detecting method, and an abnormality detecting program, which are capable of detecting an abnormality related to a reference signal after the reference signal is outputted. The receiving device includes an output part, an input part, and processing circuitry. The output part outputs a first signal that is a periodical reference signal generated based on a positioning signal to a first transmission line connected to an external device. The input part accepts an input of a second signal that is a returning signal of the first signal of the first transmission line from the external device side via a second transmission line. The processing circuitry detects an abnormality related to the reference signal based on a signal characteristic of the second signal.

22 Claims, 11 Drawing Sheets

(56) References Cited

FOREIGN PATENT DOCUMENTS

| JP | H07-273836 | A | | 10/1995 | | |
|----|-----------|---|---|---------|---|---|
| JP | 2001-237795 | A | | 8/2001 | | |
| JP | 2010088071 | A | * | 4/2010 | | |
| JP | 4719100 | B2 | | 7/2011 | | |
| JP | 2014-045288 | A | | 3/2014 | | |
| JP | 6756172 | B2 | * | 9/2020 | ............... | H03B 5/04 |
| KR | 20110082330 | A | * | 7/2011 | | |

OTHER PUBLICATIONS

Texas Instruments; "DP83640 Precision Phyter(TM)—IEEE 1588 Precision Time Protocol Transceiver"; Revised Apr. 2015; total 136 pages; Dallas, Texas; XP055313678; Retrieved from the Internet: URL:http://www.ti.com/lit/ds/symlink/dp83640.pdf.

ITU-T; "Time and phase synchronization aspects of telecommunication networks"; G.8271/Y.1366; Mar. 15, 2020; total 54 pages; International Telecommunication Union; Geneva, Switzerland; XP044289575; Retrieved from the Internet: URL:http://mirror.itu.int/dms/pay/itu-t/rec/g/T-REC-G.8271-202003-I!!PDF-E.pdf.

* cited by examiner

RECEIVING DEVICE, ABNORMALITY DETECTING METHOD, AND ABNORMALITY DETECTING PROGRAM

CROSS-REFERENCE TO RELATED APPLICATION

This application is a continuation-in-part application of PCT International Application No. PCT/JP2022/010528, which was filed on Mar. 10, 2022, and which claims priority to Japanese Patent Application No. JP2021-106850 filed on Jun. 28, 2021, the entire disclosures of each of which are herein incorporated by reference for all purposes.

TECHNICAL FIELD

The present disclosure relates to a receiving device, an abnormality detecting method, and an abnormality detecting program.

BACKGROUND

Conventionally, receiving devices which generate a reference signal at an accurate frequency or timing based on positioning signals received from GNSS (Global Navigation Satellite System) satellites etc. are known. The receiving device outputs the generated reference signal, for example, to wireless communications equipment, such as a base station for cellular phones, a transmitting station for ground digital broadcasting, etc. Note that the wireless communications equipment generates a radio wave at an accurate transmitting timing or transmitting frequency based on the acquired reference signal.

Further, a technique for maintaining a normal output of the reference signal is also proposed, which doubles the generation path of the reference signal, and when an abnormality arises in one of the generation paths, it switches the generation path from one to the other (for example, see Patent Document 1).
Patent Document 1: JP4719100B2

SUMMARY

However, the conventional technology is to secure the maintenance of the normal output of the reference signal, and it is not to secure whether the reference signal arrived normally to an external device, such as the wireless communications equipment, after the reference signal is outputted. Therefore, in order to secure whether the outputted reference signal arrived normally to the external device, it is preferred to detect whether an abnormality arises in the reference signal after the output.

Therefore, the present disclosure proposes a receiving device, an abnormality detecting method, and an abnormality detecting program, which are capable of detecting an abnormality related to a reference signal after the reference signal is outputted.

BRIEF DESCRIPTION

In order to solve the above-described problem, a receiving device according to the present disclosure includes an output part, an input part, and processing circuitry. The output part outputs a first signal that is a periodical reference signal generated based on a positioning signal to a first transmission line connected to an external device. The input part accepts an input of a second signal that is a returning signal of the first signal of the first transmission line from the external device side via a second transmission line. The processing circuitry detects an abnormality related to the reference signal based on a signal characteristic of the second signal.

Therefore, the receiving device can detect the abnormality related to the reference signal after the output (the second signal).

Further, the receiving device according to the present disclosure may include a comparer which compares a signal characteristic of the first signal with the signal characteristic of the second signal. The processing circuitry may detect the abnormality based on a comparison result of the comparer.

Therefore, the receiving device can also detect the abnormality of the reference signal before the output (the first signal), for example, and can further raise the detection accuracy about the abnormality of the reference signal after the output (the second signal).

Further, the input part may accept the input of the second signal from the second transmission line connected to the first transmission line at a terminal end on the external device side.

Therefore, the receiving device can detect whether the reference signal is inputted normally to the external device.

Further, the input part may accept the input of the second signal from the external device connected to the second transmission line.

Therefore, the receiving device can detect the abnormality which is caused in the entire first transmission line.

Further, the comparer may compare a phase of the first signal with a phase of the second signal. The processing circuitry may detect the abnormality, when a phase difference between the first signal and the second signal does not fall within a threshold range defined beforehand.

Therefore, the receiving device can perform the abnormality detection from which an influence of a path delay until the second signal after the output is reinputted is eliminated.

Further, the processing circuitry may identify that the abnormality is an interruption of the second signal, when the phase of the second signal is advanced from the phase of the first signal, and when the phase difference increases with time.

Therefore, the receiving device can detect the interruption of the second signal (the reference signal after the output).

Further, the processing circuitry may identify that the abnormality is an interruption of the first signal, when the phase of the second signal is retarded from the phase of the first signal, and when the phase difference increases with time.

Therefore, the receiving device can detect the interruption of the first signal (the reference signal before the output).

Further, the receiving device according to the present disclosure may include the processing circuitry which estimates a peculiar delay value of the second signal with respect to the first signal based on the phase difference. The processing circuitry may set the threshold range so as to include the peculiar delay value.

Therefore, according to the receiving device, it becomes possible to set the threshold range in which the peculiar delay value resulting from the lengths of the transmission lines is offset, thereby raising the detection accuracy of the abnormality. Further, the processing circuitry may perform the detection processing of the abnormality at an upstream timing corresponding to an upstream boundary of the threshold range, and when the phase difference at the upstream timing is less than a threshold defined beforehand, the processing circuitry may identify that the abnormality is noise mixing in the second signal.

Therefore, the receiving device can detect the noise mixing in the second signal.

Further, the processing circuitry may perform the detection processing of the abnormality at a downstream timing corresponding to a downstream boundary of the threshold range, and when the phase difference at the downstream timing does not fall within the threshold range, the processing circuitry may identify that the abnormality is an interruption of the second signal.

Therefore, the receiving device can detect the interruption of the second signal.

Further, the processing circuitry may perform the detection processing of the abnormality at three or more timings set at an interval defined beforehand in one cycle of the reference signal.

Therefore, the receiving device can detect the abnormality early.

Further, an abnormality detecting method according to the present disclosure includes outputting a first signal that is a periodical reference signal generated based on a positioning signal to a first transmission line connected to an external device, accepting an input of a second signal that is a returning signal of the first signal of the first transmission line from the external device side via a second transmission line, and detecting an abnormality related to the reference signal based on a signal characteristic of the second signal.

Therefore, the abnormality detecting method can detect the abnormality related to the reference signal after the output (the second signal).

Further, an abnormality detecting program according to the present disclosure causes a computer to execute processing which includes outputting a first signal that is a periodical reference signal generated based on a positioning signal to a first transmission line connected to an external device, accepting an input of a second signal that is a returning signal of the first signal of the first transmission line from the external device side via a second transmission line, and detecting an abnormality related to the reference signal based on a signal characteristic of the second signal.

Therefore, the abnormality detecting program can detect the abnormality related to the reference signal after the output (the second signal).

DETAILED DESCRIPTION

Figure 1:
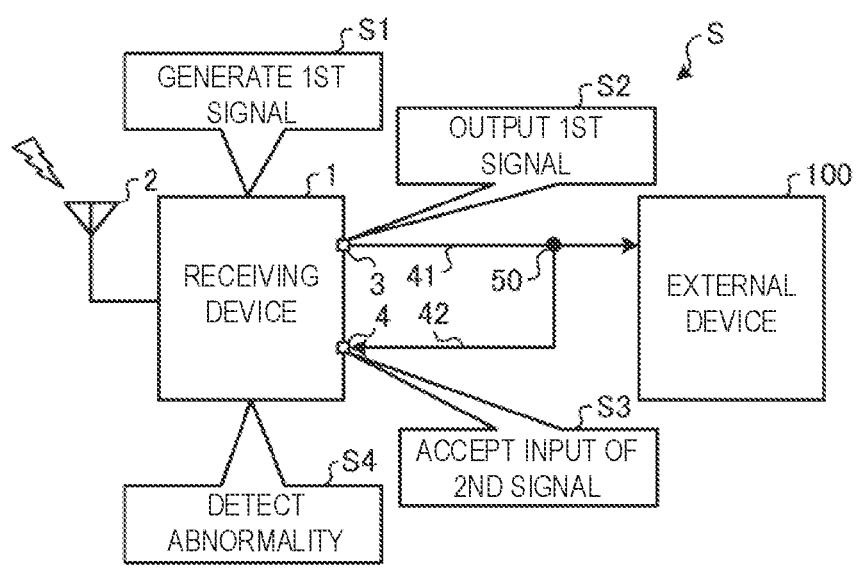
FIG. 1 is a view illustrating an outline of an abnormality detecting method according to one embodiment.

Hereinafter, embodiments of the present disclosure will be described in detail with reference to the drawings. Note that, in each embodiment below, redundant explanation is omitted by assigning the same reference characters to the same parts.

First, an outline of an abnormality detecting method according to one embodiment is described with reference to FIG. 1. FIG. 1 is a view illustrating the outline of the abnormality detecting method according to this embodiment. The abnormality detecting method according to this embodiment may be performed by a receiving device 1 illustrated in FIG. 1. Note that, in FIG. 1, one example of a configuration of a receiving system S including the receiving device 1 is also illustrated.

As illustrated in FIG. 1, the receiving system S according to this embodiment may include the receiving device 1 and an external device 100. In the receiving system S, the receiving device 1 may be connected wiredly with the external device 100 via a first transmission line 41. Further, the receiving device 1 may be connected to a second transmission line 42 which is connected to the first transmission line 41 via a connection 50.

The receiving device 1 may be a GNSS (Global Navigation Satellite System) receiver, for example. The receiving device 1 may receive a GNSS signal which is a positioning signal, and generate a reference signal (a first signal described below) which is synchronized with a reference time indicated by the GNSS signal. Note that the reference time may be a GPS (Global Positioning System) time or a UTC (Coordinated Universal Time) time, for example.

The external device 100 may be a device which utilizes the reference signal generated by the receiving device 1. For example, the external device 100 may be a device which functions as a base station of cellular phones, a device which functions as a transmitting station of ground digital broadcasting, a device in connection with vehicle-to-vehicle communications, a device in connection with road-to-vehicle communications, etc. Note that the external device 100 may be any other devices, as long as it utilizes the reference signal.

Here, a conventional technology related to the receiving device is described. As for the conventional technologies, there is a technology for maintaining a normal output of the reference signal by doubling a generation path of the reference signal, and switching the generation path from one to the other when an abnormality arises in one of the generation paths.

However, the conventional technology is to secure the maintenance of the normal output of the reference signal, and it is not to secure whether the outputted reference signal arrived normally to the external device, such as the wireless communications equipment. Therefore, in order to secure whether the outputted reference signal arrived normally to the external device, it is preferred to detect whether an abnormality arises in the reference signal after the output. Note that the abnormality related to the reference signal after the output includes, for example, noise mixing of other signals by a third party, and an interruption or stop of the reference signal due to a disconnection of the transmission line.

Therefore, by the abnormality detecting method according to this embodiment, the reference signal after the receiving device 1 outputs to the external device may be reinputted into the receiving device 1, and the receiving device 1 may then analyze a signal characteristic of the reinputted reference signal to detect the abnormality related to the reference signal after the output.

In detail, by the abnormality detecting method according to this embodiment, the receiving device 1 may first generate a first signal which is a periodical reference signal based on the positioning signals received by a receiving part 2 (Step S1). The periodical reference signal may be a periodical signal synchronized with the reference time indicated by the positioning signal, and, for example, it may be a signal of 1PPS (Pulse Per Second). Note that the periodical reference signal may be a pulse signal at a frequency exceeding or below 1 Hz, instead of 1PPS.

Next, by the abnormality detecting method according to this embodiment, the receiving device 1 may output the first signal to the first transmission line 41 connected to the external device 100 (Step S2). Therefore, the reference signal may be inputted into the external device 100 via the first transmission line 41.

Next, by the abnormality detecting method according to this embodiment, the receiving device 1 may accept an input into an input part 4 of a second signal which is a returning signal of the first signal of the first transmission line 41 from the external device 100 side via the second transmission line 42 (Step S3). In the example illustrated in FIG. 1, the receiving device 1 may accept the input of the second signal from the second transmission line 42 connected to the first transmission line 41 at the terminal end on the external device 100 side.

Next, by the abnormality detecting method according to this embodiment, the receiving device 1 may detect an abnormality related to the reference signal based on the signal characteristic of the inputted second signal (Step S4). Here, the signal characteristic may be a phase, a cycle, a frequency, a duty ratio, and the number of pulses in a given period, for example.

In detail, by the abnormality detecting method according to this embodiment, the receiving device 1 may detect the abnormality related to the second signal (i.e., the abnormality related to the reference signal after the output), when the signal characteristic of the second signal does not satisfy a criterion defined beforehand. As one example, the receiving device 1 may detect the abnormality, when the phase of the second signal is retarded or advanced from a reference phase by a threshold or more.

Thus, by the abnormality detecting method according to this embodiment, the receiving device 1 can detect the abnormality related to the reference signal after the output by reinputting the reference signal after the output to the external device (the second signal) into the receiving device 1, and analyzing the signal characteristic.

Further, since the receiving device 1 inputs the second signal via the first transmission line 41 and the second transmission line 42, it can be considered that the reference signal is normally inputted into the external device 100, if the abnormality is not detected in the second signal.

Note that, by the abnormality detecting method according to this embodiment, the signal characteristic of the reference signal before the output (the first signal) may be compared with the signal characteristic of the reference signal after the output (the second signal), and the abnormality related to the reference signal can be detected based on the comparison result, and the details will be described later.

Figure 2:
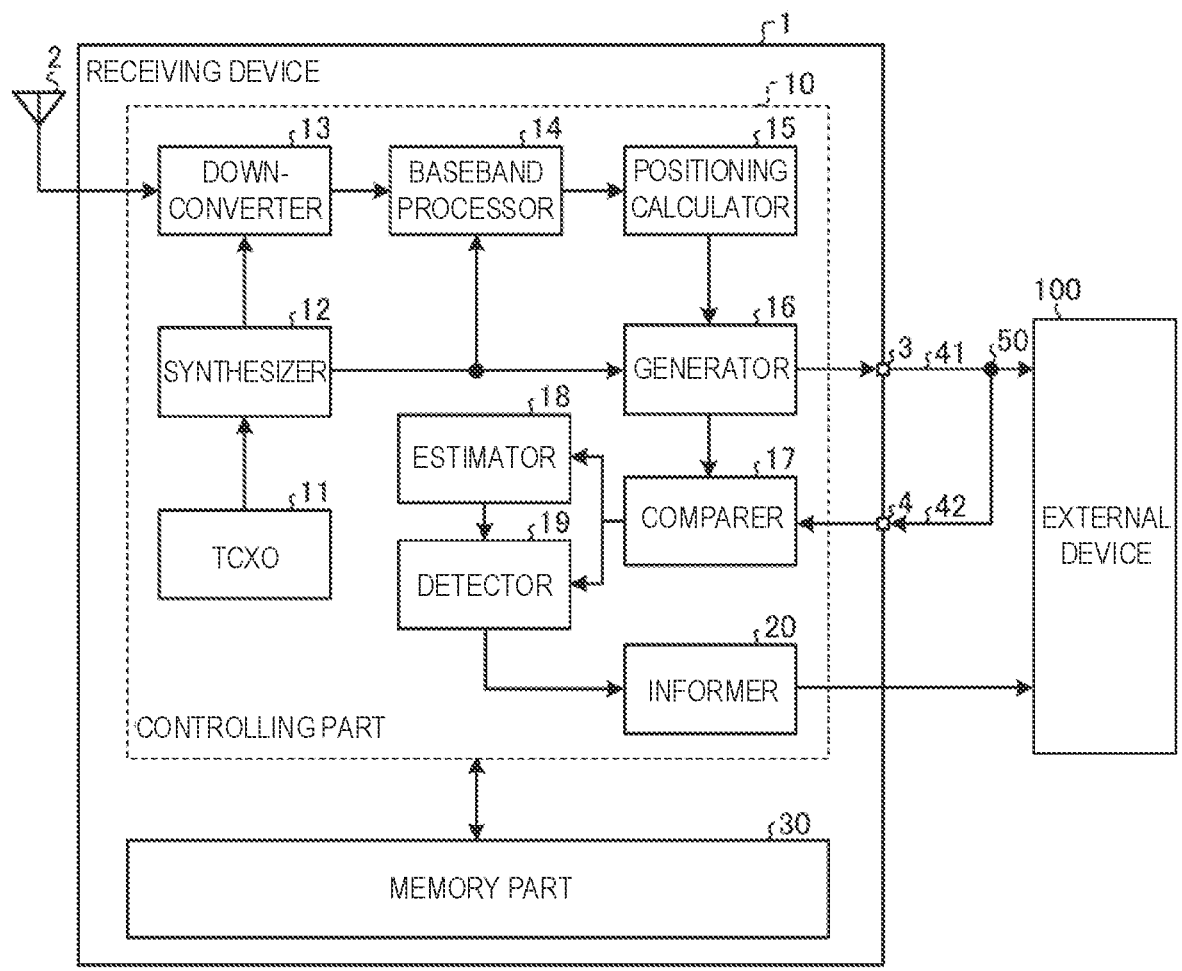
FIG. 2 is a functional block diagram illustrating one example of a configuration of a receiving device according to this embodiment.

Next, one example of a configuration of the receiving device 1 according to this embodiment is described with reference to FIG. 2. FIG. 2 is a functional block diagram illustrating one example of the configuration of the receiving device 1 according to this embodiment. Note that, in the block diagram of FIG. 2, only necessary components are illustrated by functional blocks in order to describe the features of this embodiment, and therefore, description of common components is omitted.

In other words, each component illustrated by the block diagram of FIG. 2 is a functional concept, and it is not necessarily configured physically as illustrated. For example, the concrete form of distribution and integration of the functional block(s) is not limited to the one illustrated, but a part or all thereof may be configured by distributing and/or integrating functionally or physically per arbitrary unit, according to various kinds of loads, status of use, etc.

As illustrated in FIG. 2, the receiving device 1 may include the receiving part 2, an output part 3, the input part 4, a controlling part 10, and a memory part 30.

The receiving part 2 may be an antenna for receiving the positioning signals. For example, the receiving part 2 may receive the positioning signals which are GNSS signals from GNSS satellites. Note that the GNSS satellites may be the GPS Satellites, the QZSS (Quasi-Zenith Satellite System) satellites, the GLONASS (Global Navigation Satellite System) satellites, the GALILEO satellites, etc.

The output part 3 may have an output terminal which outputs the first signal which is the reference signal generated by the controlling part 10 of the receiving device 1. As illustrated in FIG. 2, the output part 3 may output the first signal to the first transmission line 41 connected to the external device 100. Therefore, the reference signal may be outputted to the external device 100 via the first transmission line 41.

The input part 4 may have an input terminal into which the second signal which is the returning signal of the first signal of the first transmission line 41 from the external device 100 side via the second transmission line 42 is inputted. As illustrated in FIG. 2, the input part 4 may accept the input into the receiving device 1 of the second signal which is inputted into the input terminal from the second transmission line 42 connected to the first transmission line 41 at the terminal end on the external device 100 side. Note that the terminal end on the external device 100 side may be any position as long as it is closer to the external device 100 (in detail, a position closer to the external device 100 than to the output part 3).

The first transmission line 41 and the second transmission line 42 may be cable members which transmit the signal. The first transmission line 41 and the second transmission line 42 may be coaxial cables, for example.

The connection 50 may be a connecting member which connects the first transmission line 41 with the second transmission line 42. The connection 50 may be a distributor which distributes the signal transmitted through the first transmission line 41 to the second transmission line 42, for example.

Note that the connection 50 may be disposed, in the first transmission line 41, at the terminal end on the external device 100 side. Therefore, since a comparatively long transmission distance of the second signal through the first transmission line 41 can be secured, a subsequent detector 19 can detect with high precision the abnormality of the reference signal (the second signal) which is arisen in the first transmission line 41.

The controlling part 10 may include processing circuitry configured to function as a TCXO 11, a synthesizer 12, a downconverter 13, a baseband processor 14, a positioning calculator 15, a generator 16, a comparer 17, an estimator 18, the detector 19, and an informer 20.

Here, the receiving device 1 may include a computer or various kinds of circuits having a CPU (Central Processing Unit), a ROM (Read Only Memory), a RAM (Random Access Memory), a hard disk drive, and an input/output port, for example.

The CPU of the computer may read and execute, for example, an abnormality detecting program (a non-transitory computer-readable storage medium having stored thereon machine-readable instructions that, when executed by one or more processors of an apparatus, cause the apparatus to perform a method) stored in the ROM to function as the TCXO 11, the synthesizer 12, the downconverter 13, the baseband processor 14, the positioning calculator 15, the generator 16, the comparer 17, the estimator 18, the detector 19, and the informer 20 of the controlling part 10.

Further, at least a part or all of the TCXO 11, the synthesizer 12, the downconverter 13, the baseband processor 14, the positioning calculator 15, the generator 16, the comparer 17, the estimator 18, the detector 19, and the informer 20 of the controlling part 10 may also be comprised of hardware, such as an ASIC (Application Specific Integrated Circuit) and an FPGA (Field Programmable Gate Array).

Moreover, the memory part 30 may be a memory comprised of a storage device, such as a semiconductor memory and a hard disk drive. The memory part 30 may store a variety of information necessary for various programs and processing of the controlling part 10.

The TCXO 11 may be an oscillator which uses crystal as a resonator. The TCXO 11 may generate a signal at a frequency set beforehand, and output it to the synthesizer 12.

The synthesizer 12 may generate a demodulation signal from the signal generated by the TCXO 11, and output it to the downconverter 13. Further, the synthesizer 12 may output to the baseband processor 14 and the generator 16 a clock signal converted from the signal generated by the TCXO 11.

The downconverter 13 may accept an input of the positioning signals from the receiving part 2, and an input of the demodulation signal from the synthesizer 12. The downconverter 13 may carry out a downconversion of the positioning signal which is an RF (Radio Frequency) signal by using the demodulation signal to convert the RF signal into an IF (Intermediate Frequency) signal. The downconverter 13 may output the IF signal to the baseband processor 14.

The baseband processor 14 may demodulate the IF signal using the clock signal outputted from the synthesizer 12 as a sampling frequency to convert it into the baseband signal. The baseband processor 14 may output the baseband signal to the positioning calculator 15.

The positioning calculator 15 may perform a positioning calculation based on the baseband signal inputted from the baseband processor 14 to calculate the position of the receiving device 1 and the reference time. In detail, the positioning calculator 15 may read navigation messages indicated by the baseband signals and acquire the orbits of the satellites, and calculate the position of the receiving device 1 and calculate a time error of the clock on the receiving device 1 side and the clock mounted on the GNSS satellite.

The positioning calculator 15 can obtain the accurate reference time which is synchronized with the highly-precise clock mounted on the GNSS satellite by correcting the time of the clock on the receiving device 1 side based on the time error. Further, the positioning calculator 15 may calculate a clock offset and a clock drift of the clock signal by performing the positioning calculation. The positioning calculator 15 may output the clock offset and the clock drift to the generator 16.

The generator 16 may correct the phase and the frequency of the clock signal based on the clock offset and the clock drift which are inputted from the positioning calculator 15. In detail, the generator 16 may correct a rising timing of the clock signal based on the clock offset. The generator 16 may correct a frequency of the clock signal based on the clock drift. Further, the generator 16 may have the function of a frequency divider, which generates a reference signal of 1PPS, for example, synchronized with the reference time by dividing the frequency of the clock signal of which the phase and the frequency are corrected.

Note that, when a hold-over state occurs in which the reception of the positioning signal is stopped due to extraneous noise, such as a disturbance wave, and a failure of the receiving part 2, the generator 16 may generate a new reference signal using the past reference signal which was generated before the hold-over state occurred.

The comparer 17 may compare the signal characteristics between the first signal inputted from the generator 16 and the second signal inputted from the input part 4. The comparer 17 may be, for example, a phase comparator, which compares the phase of the first signal with the phase of the second signal, as the signal characteristic. In detail, the comparer 17 may compare the phases between the latest first signal and the latest second signal. Then, the comparer 17 may calculate a phase difference between the first signal and the second signal, as a comparison result.

Note that, when one of the first signal and the second signal is stopped and no longer inputted into the comparer 17, the comparer 17 may calculate the phase difference based on the signal immediately before the signal is stopped. Note that the details will be described later.

The comparer 17 may have a function for comparing the signal characteristic, such as the cycle, the frequency, the duty ratio, and the number of pulses in a given period, of the first signal and the second signal, instead of being the phase comparator.

Further, the comparer 17 may compare any one of the signal characteristics among the phase, the cycle, the frequency, the duty ratio, and the number of pulses in the given period, or may compare two or more of the signal characteristics.

The estimator 18 may estimate a peculiar delay value of the second signal with respect to the first signal based on the phase difference which is the comparison result of the comparer 17. The peculiar delay value may be a unique delay time which occurs according to the lengths of the first transmission line 41 and the second transmission line 42.

Note that the peculiar delay value may be expressed by time, or may be expressed by a phase angle (degree or radian).

Figure 6:
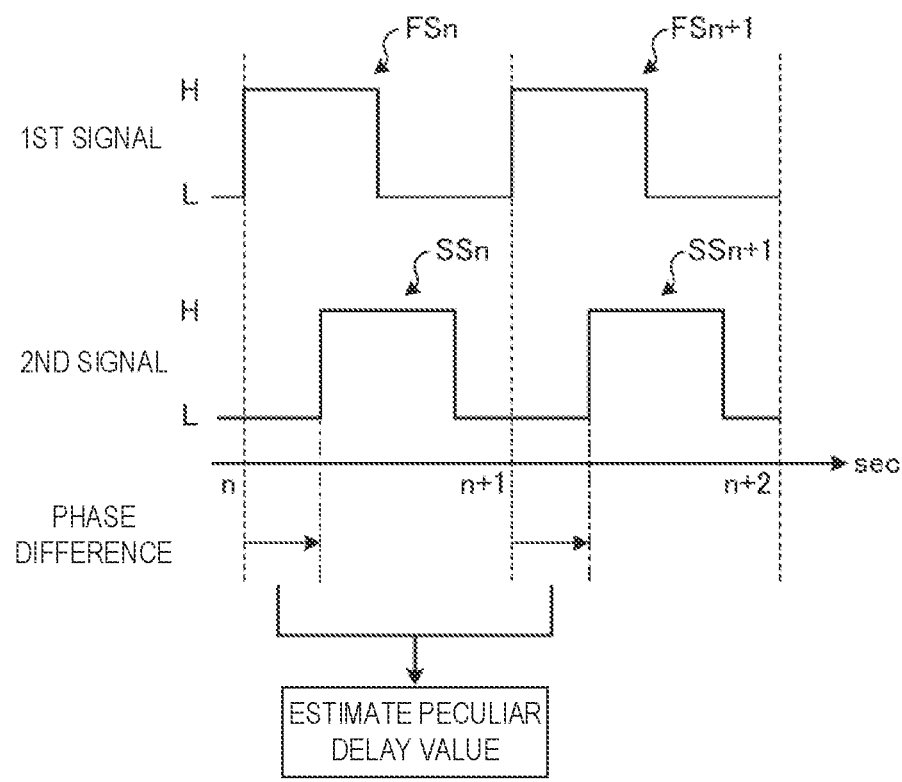
FIG. 6 is a view illustrating one example of estimation processing of a peculiar delay value by an estimator.

The peculiar delay value may be used when setting a threshold range in the subsequent detector 19, and the details of a method of setting the threshold range and a method of estimating the peculiar delay value will be described later with reference to FIGS. 6 and 7.

The detector 19 may detect an abnormality related to the reference signal based on the signal characteristic(s) of the second signal. In the example illustrated in FIG. 2, the detector 19 may detect the abnormality related to the reference signal based on the comparison result of the comparer 17. Note that the details of detection processing of the abnormality by the detector 19 will be described later.

The informer 20 may inform abnormality information on the abnormality to an exterior device, when the abnormality is detected by the detector 19. The abnormality information may include information, such as the existence of the abnormality, the kind of the identified abnormality (the interruption and the noise mixing), and the occurrence time of the abnormality.

For example, the informer 20 may inform (transmit) the abnormality information in a text format to the external device 100, or a terminal unit of an administrator who manages the external device 100. Alternatively, if the receiving device 1 is provided with a display unit (non-illustrated), the informer 20 may display the abnormality information on the display unit.

Further, if the receiving device 1 is provided with a light source (non-illustrated), the informer 20 may notify the abnormality information indicative of the existence of the abnormality by turning on the light source.

Figure 3:
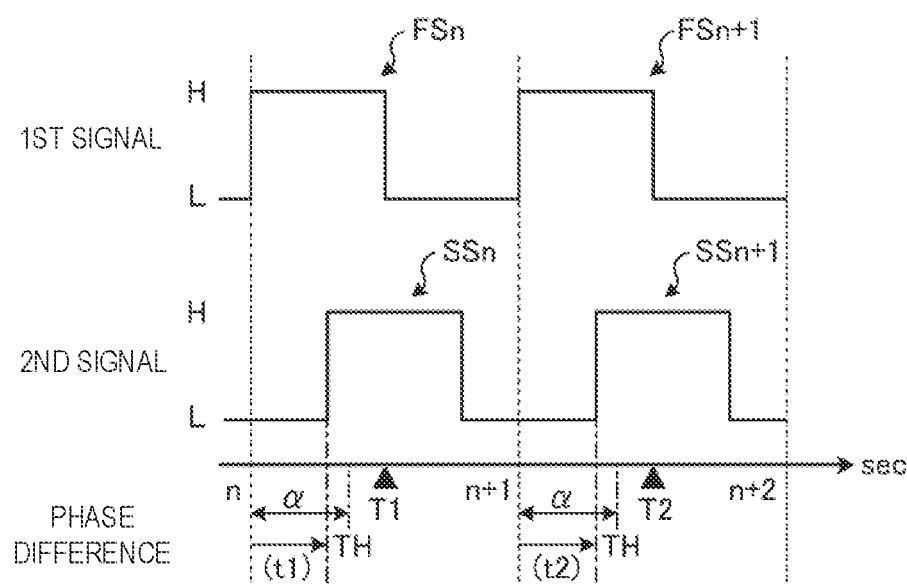
FIG. 3 is a view illustrating one example (#1) of detection processing of an abnormality by a detector.
Figure 4:
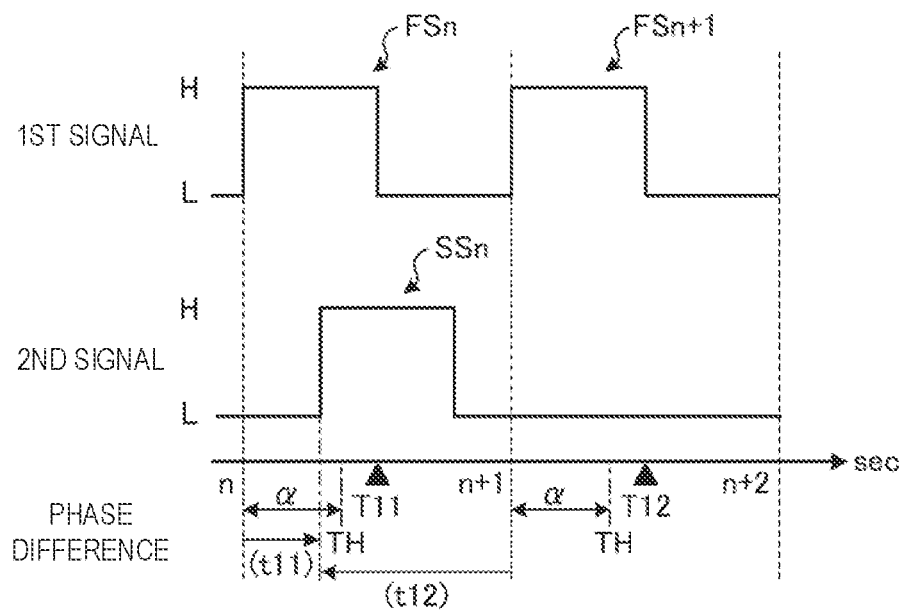
FIG. 4 is a view illustrating one example (#2) of the detection processing of the abnormality by the detector.
Figure 5:
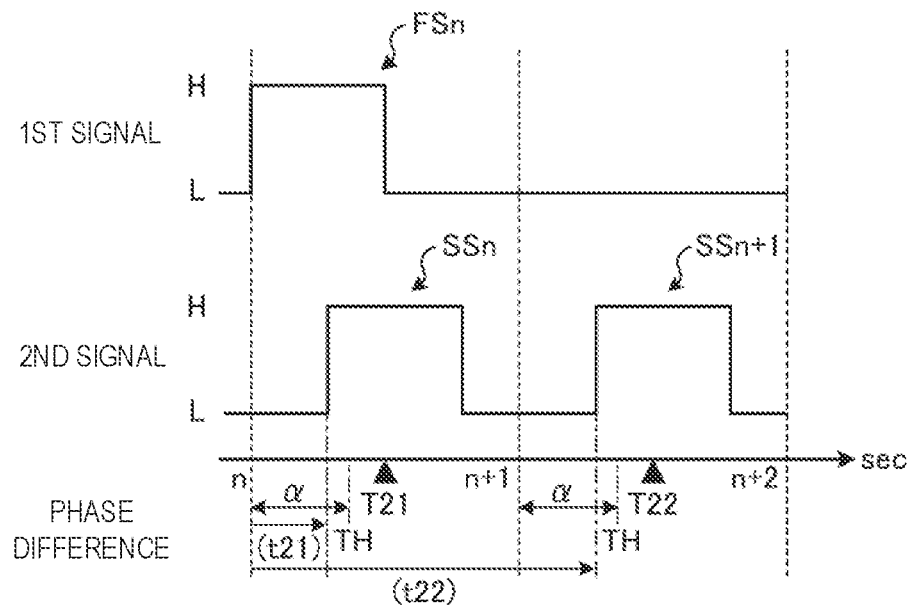
FIG. 5 is a view illustrating one example (#3) of the detection processing of the abnormality by the detector.

Here, the detection processing by the detector 19 is described in further detail with reference to FIGS. 3 to 5. FIGS. 3 to 5 are views illustrating examples (#1-#3) of the detection processing of the abnormality by the detector 19. FIG. 3 illustrates a case where the first signal and the second signal are normal. FIG. 4 illustrates a case where the second signal is abnormal (interrupted), and FIG. 5 illustrates a case where the first signal is abnormal (interrupted).

Further, in FIGS. 3 to 5, the first signal outputted at a time n is referred to as a "first signal FSn," and the second signal corresponding to the first signal FSn is referred to as a "second signal SSn." Note that the first signal and the second signal are collectively referred to as a "first signal FS" and a "second signal SS," if they are not discriminated by time.

As illustrated in FIG. 3, since the second signal SSn is reinputted after it is outputted to the exterior device, it may be inputted into the input part 4 so as to be delayed from the first signal FSn. Similarly, a second signal SSn+1 may be inputted into the input part 4 so as to be delayed from a first signal FSn+1. Further, since the delay time of the second signal SS from the first signal FS originates in hardware, such as the first transmission line 41 and the second transmission line 42, it may be constant in general.

That is, if the first signal FS and the second signal SS are normal, the second signal SS may be always delayed in the phase from the first signal FS, and the phase difference may always fall within a certain range.

Therefore, the detector 19 may detect the existence of the abnormality related to the reference signal (the first signal FS or the second signal SS) based on whether the phase difference which is the comparison result of the comparer 17 falls within a threshold range α defined beforehand. Note that, in FIGS. 3 to 5, the threshold range α may be a range from the rising time of the first signal FS to the time of a threshold TH. Further, in FIGS. 3 to 5, the detector 19 may read the phase difference from the comparer 17 only once for every cycle of the first signal FS.

As illustrated in FIG. 3, when a phase difference t1 of the comparer 17 read at a time T1 falls within the threshold range α, the detector 19 may detect that the reference signals at the time n (the first signal FSn and the second signal SSn) are normal.

Similarly, when a phase difference t2 of the comparer 17 read at a time T2 falls within the threshold range α, the detector 19 may detect that the reference signals at a time n+1 (first signal FSn+1 and the second signal SSn+1) are normal.

On the other hand, when the phase difference read from the comparer 17 does not fall within the threshold range α, the detector 19 may detect the abnormality related to the reference signal (the first signal FS or the second signal SS). This is described with reference to FIGS. 4 and 5.

First, in FIG. 4, a case where the second signal SSn+1 at the time n+1 is externally stopped is illustrated as the abnormality related to the second signal SS.

The detector 19 may detect the abnormality related to the second signal SS, when the phase difference read from the comparer 17 does not fall within the threshold range α, and the phase of the second signal SS is advanced from the phase of the first signal FS.

In the example illustrated in FIG. 4, a phase difference t12 read at a time T12 is larger than the threshold range α, since the phase of the latest first signal FSn+1 is compared with the phase of the second signal SSn immediately before the interruption. That is, the phase difference t12 may not fall within the threshold range α.

As illustrated in FIG. 4, when the first signal FSn and the second signal SSn are normal, a phase difference t11 may become such a phase difference that the phase of the second signal SSn is retarded from the phase of the first signal FSn. On the other hand, the phase difference t12 in which the second signal SSn+1 is stopped may become such a phase difference that the phase of the second signal SSn is advanced from the first signal FSn+1 mathematically. That is, the phase of the second signal SS may be advanced from the phase of the first signal FS.

In more detail, when the phase difference which is obtained by subtracting the phase of the second signal SS from the phase of the first signal FS is calculated, the phase difference t11 may become a negative value, and the phase difference t12 may become a positive value. That is, the sign of the phase difference may change between the case where the second signal SS is normal and the case where the second signal SS is abnormal. Note that the signs are reversed if the phase difference obtained by subtracting the phase of the first signal FS from the phase of the second signal SS is calculated.

Thus, the detector 19 can detect the abnormality related to the reference signal after the output (the second signal SS) by using the phase difference which is the comparison result of the comparer 17.

Further, in a case where the phase difference increases with time when the abnormality related to the second signal SS is detected, the detector 19 may identify that the detected abnormality is an interruption of the second signal SS. This is because the phase difference increases gradually with time since the phase comparison is made between the second signal SSn immediately before the interruption and the latest first signal FS (the first signal FSn+2 or subsequent first signals).

In more detail, when the phase difference obtained by subtracting the phase of the second signal SS from the phase of the first signal FS is calculated, the phase difference may increase in the positive value each time a cycle passes.

That is, when an abnormality is detected, the phase of the second signal SS is advanced from the phase of the first signal FS, and the phase difference increases with time, the detector 19 may identify that the abnormality is the interruption of the second signal SS. Therefore, the interruption of the reference signal after the output can be detected.

Note that, when the phase difference does not increase with time, and it returns so as to fall within the threshold range α, the detector 19 may identify that it is a temporary interruption (outage or instantaneous interruption) of the second signal SS.

Next, in FIG. 5, a case where the first signal FSn+1 at the time n+1 is stopped is illustrated as the abnormality related to the first signal FS. That is, in FIG. 5, a case where only the second signal SSn+1 is inputted into the comparer 17 is illustrated.

When the phase difference read from the comparer 17 does not fall within the threshold range α, and the phase of the second signal SS is retarded from the phase of the first signal FS, the detector 19 may detect the abnormality related to the first signal FS.

In the example illustrated in FIG. 5, a phase difference t22 read at a time T22 increases because the first signal FSn immediately before the interruption is compared with the phase of the latest second signal SSn+1. That is, the phase difference t22 may not fall within the threshold range α.

Further, as illustrated in FIG. 5, a phase difference t21 and the phase difference t22 both may become such a phase difference that the phase of the second signal SS is retarded from the phase of the first signal FS. That is, the phase of the second signal SS may be retarded from the phase of the first signal FS.

In more detail, when the phase difference obtained by subtracting the phase of the second signal SS from the phase of the first signal FS is calculated, both the phase difference t21 and the phase difference t22 may become a negative value. That is, the sign of the phase difference may not change between the case where the first signal FS is normal and the case where the first signal FS is abnormal.

Thus, the detector 19 can detect the abnormality related to the reference signal before the output (the first signal FS) by using the phase difference which is the comparison result of the comparer 17. In more detail, the detector 19 can detect the abnormality in the input of the first signal FS from the generator 16 into the comparer 17.

Further, when the abnormality related to the first signal FS is detected, and the phase difference increases with time, the detector 19 may identify that the detected abnormality is an interruption of the first signal FS (an interruption of the input into the comparer 17). This is because the phase difference increases gradually with time since the comparison is made between the phase of the first signal FSn immediately before the interruption and the latest second signal SS (the second signal SSn+2 and subsequent signals).

In more detail, when the phase difference obtained by subtracting the phase of the second signal SS from the phase of the first signal FS is calculated, the phase difference may increase in the negative value each time the cycle passes.

That is, when the abnormality is detected, the phase of the second signal SS is retarded from the phase of the first signal FS, and the phase difference increases with time, the detector 19 may identify that the abnormality is the interruption of the first signal FS.

Therefore, the detector 19 can detect an interruption of the reference signal before the output. In more detail, the detector 19 can detect that the input of the first signal FS from the generator 16 into the comparer 17 is stopped.

Note that, when the phase difference does not increase with time, and it returns so as to fall within the threshold range α, the detector 19 may identify that it is a temporary interruption (outage or instantaneous interruption) of the first signal FS.

As illustrated in FIGS. 3 to 5, the detector 19 can detect the abnormality of each of the reference signal before the output (the first signal FS) and the reference signal after the output (the second signal SS) by detecting the abnormality based on the comparison result of the comparer 17.

Further, the detector 19 can detect the abnormality when a foreign signal other than the reference signal is inputted as the second signal SS by performing the comparison with the first signal FS.

That is, by detecting the abnormality based on the comparison result of the comparer 17, the detector 19 can also detect the abnormality of the reference signal before the output (the first signal FS), and can further raise the detection accuracy about the abnormality of the reference signal after the output (the second signal SS).

Further, the detector 19 can perform the abnormality detection from which the influence of the path delay until the second signal SS after the output is reinputted is eliminated, by detecting the abnormality based on whether the phase difference between the first signal FS and the second signal SS falls within the threshold range α.

Next, setting processing of the above-described threshold range α is described with reference to FIGS. 6 and 7. For example, the threshold range α may be set based on the peculiar delay value described above. FIG. 6 is a view illustrating one example of estimation processing of the peculiar delay value by the estimator 18. FIG. 7 is a view illustrating one example of the setting processing of the threshold range α by the detector 19.

First, the estimation processing of the peculiar delay value is described with reference to FIG. 6. As described above, since the second signal SS is reinputted through the first transmission line 41 and the second transmission line 42 after the output, its phase may be retarded from the first signal FS by the peculiar delay value.

That is, the peculiar delay value may be a value (time or phase angle) according to the lengths of the first transmission line 41 and the second transmission line 42. In other words, since the peculiar delay value is a delay resulting from hardware, it may be always a fixed value in general. In the example illustrated in FIG. 6, the peculiar delay value of the second signal SSn to the first signal FSn may be substantially the same as the peculiar delay value of the second signal SSn+1 to the first signal FSn+1.

Then, the estimator 18 may estimate the peculiar delay value based on the phase difference between the first signal FS and the second signal SS. For example, the estimator 18 may estimate an average value of a plurality of phase differences sequentially acquired during a given period, as the peculiar delay value. In the example illustrated in FIG. 6, the estimator 18 may estimate an average value of the phase difference between the first signal FSn and the second signal SSn and the phase difference between the first signal FSn+1 and the second signal SSn+1, as the peculiar delay value.

Note that the estimator 18 may estimate a mode or a median of the plurality of phase differences acquired during the given period, as the peculiar delay value, instead of the average value. Alternatively, the estimator 18 may estimate the phase difference acquired at a certain timing as the peculiar delay value.

Next, the setting processing of the threshold range α by the detector 19 is described with reference to FIG. 7. Note that, in FIG. 7, a peculiar delay value D estimated by the estimator 18 is illustrated. The detector 19 may set, for example, a first threshold THa upstream of the peculiar delay value D, and a second threshold THb downstream of the peculiar delay value D. Note that the "upstream" is a direction in which the phase is advanced from the peculiar delay value D, and the "downstream" is a direction in which the phase is retarded from the peculiar delay value D. Then, the detector 19 may set a range between the first threshold THa and the second threshold THb as the threshold range α.

Figure 7:
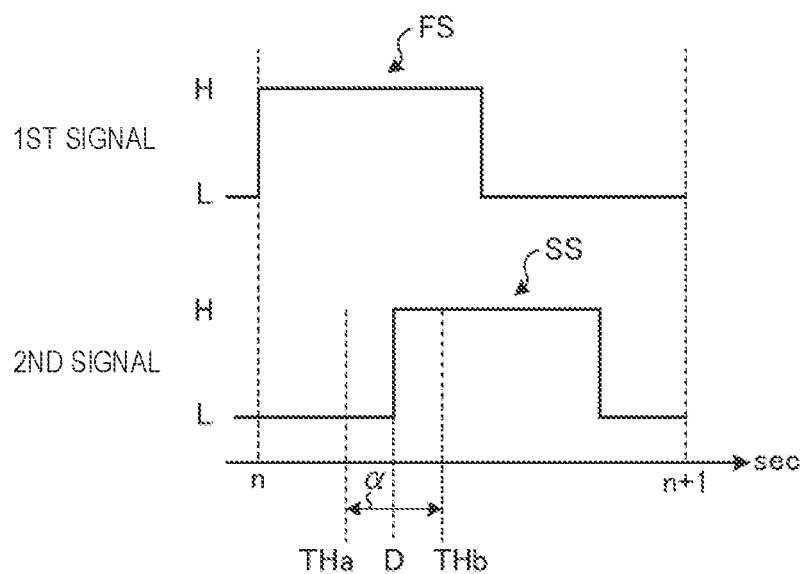
FIG. 7 is a view illustrating one example of setting processing of a threshold range by the detector.

In the example illustrated in FIG. 7, the threshold range α in which the middle of the first threshold THa and the second threshold THb is used as the peculiar delay value D is illustrated. That is, the detector 19 may set the threshold range α so as to include the peculiar delay value estimated by the estimator 18. Therefore, it becomes possible to set the threshold range α in which the peculiar delay value D resulting from the lengths of the first transmission line 41 and the second transmission line 42 is offset, thereby raising the detection accuracy of the abnormality.

Further, by setting the range between the first threshold THa upstream of the peculiar delay value D and the second threshold THb downstream of the peculiar delay value D as the threshold range α, the detector 19 can permit a slight deviation of the phase difference in the detection processing of the abnormality.

Note that the times T1, T2, T11, T12, T21, and T22 (see FIGS. 3 to 5) which are the timings at which the phase difference is read (i.e., the timings at which the detection processing of the abnormality is performed) may be downstream of the peculiar delay value D. Further, the timing at which the detection processing of the abnormality is performed may be downstream of the second threshold THb. Therefore, the detector 19 can avoid with high precision reading the phase difference in a state where the second signal SS is not inputted.

On the other hand, the detector 19 can detect that the noise mixed in the second signal SS by the time the latest second signal SS is inputted, by setting the timing at which the detection processing of the abnormality is performed upstream of the first threshold THa. This is described with reference to FIGS. 8 and 9.

Figure 8:
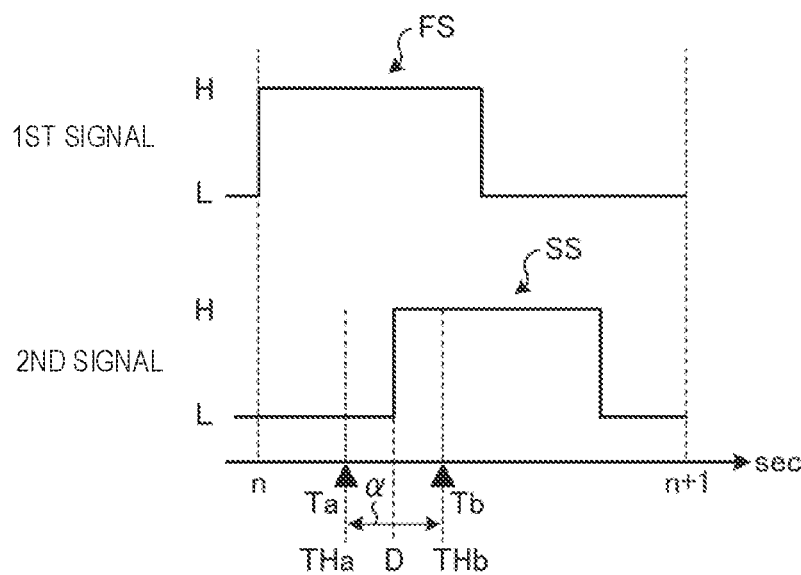
FIG. 8 is a view illustrating a timing of the detection processing of the abnormality by the detector.
Figure 9:
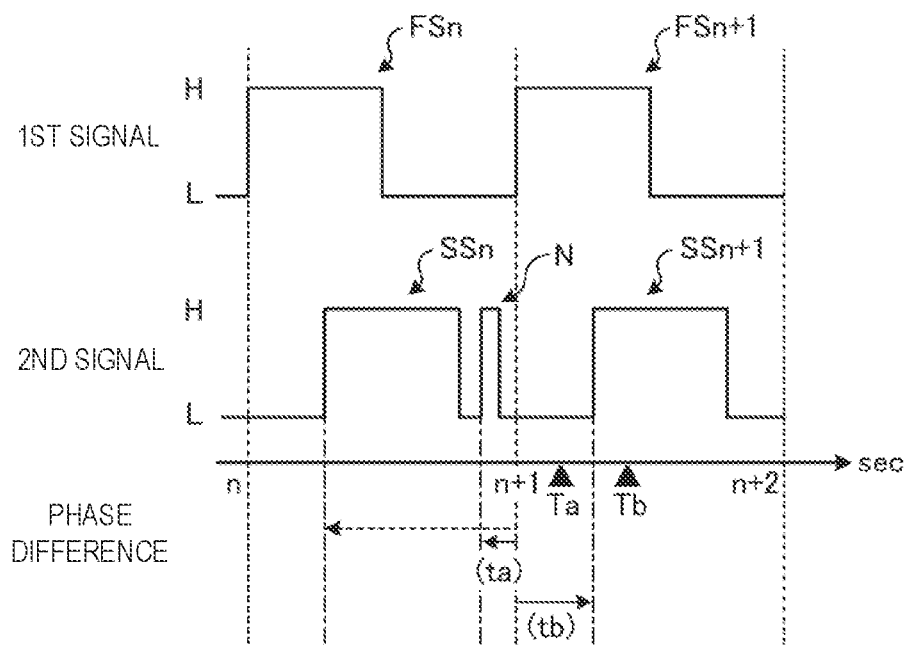
FIG. 9 is a view illustrating one example of processing for identifying noise mixing of a second signal by the detector.

FIG. 8 is a view illustrating a timing of the detection processing of the abnormality by the detector 19. FIG. 9 is a view illustrating one example of processing for identifying the noise mixing in the second signal SS by the detector 19.

As illustrated in FIG. 8, the detector 19 may perform the detection processing at timings Ta and Tb corresponding to the both boundaries of the threshold range α. In detail, the detector 19 may perform the detection processing at the upstream timing Ta corresponding to the upstream boundary (the first threshold THa) of the threshold range α, and the downstream timing Tb corresponding to the downstream boundary (the second threshold THb).

Although in FIG. 8 the timing which overlaps with the first threshold THa is the upstream timing Ta, the upstream timing Ta may be slightly upstream of the first threshold THa, or slightly downstream of the first threshold THa. Further, although in FIG. 8 the timing which overlaps with the second threshold THb is the downstream timing Tb, the downstream timing Tb may be slightly upstream of the second threshold THb, or slightly downstream of the second threshold THb. That is, as the upstream timing Ta and the downstream timing Tb, arbitrary timings may be adopted, as long as they are before and after the input of the second signal SS.

In FIG. 9, the abnormality of the noise mixing in the second signal SS is detected using the upstream timing Ta and the downstream timing Tb. Note that, in FIG. 9, noise N is mixed between the second signal SSn and the second signal SSn+1. In this case, the detector 19 may first perform the detection processing at the upstream timing Ta, and when a phase difference ta at the upstream timing Ta is less than a threshold defined beforehand, it may identify that the abnormality is the noise mixing in the second signal SS.

Here, if the noise N is not mixed in the second signal SS, the phase difference ta (broken line arrow) at the upstream timing Ta may become a phase difference between the first signal FSn+1 and the second signal SSn. This is because the upstream timing Ta is a timing before the input of the second signal SSn+1.

On the other hand, if the noise N is mixed in the second signal SS, the phase difference ta (solid line arrow) at the upstream timing Ta may become a phase difference between the first signal FSn+1 and the noise N. In other words, the phase difference ta when the noise N is mixed may become smaller than the phase difference ta when the noise N is not mixed.

That is, the phase difference ta when the noise N is mixed may become less than the threshold (the phase difference ta when the noise N is not mixed). Therefore, the detector 19 can detect the mixing of the noise N in the second signal SS.

Next, the detector 19 may perform the detection processing at the downstream timing Tb, and when a phase difference tb at the downstream timing Tb falls within the threshold range α, it may detect that the second signal SSn+1 is inputted normally.

If the second signal SSn+1 in FIG. 9 is stopped, the phase difference tb at the downstream timing Tb may become the phase difference ta (the solid line arrow or the broken line arrow) at the upstream timing Ta, and it may no longer fall within the threshold range α.

That is, the detector 19 may identify that the abnormality is the interruption of the second signal SS, when the phase difference tb at the downstream timing Tb does not fall within the threshold range α. Therefore, the detector 19 can detect the interruption of the second signal SS.

Note that, although in the example described above the estimated peculiar delay value is used for the setting processing of the threshold range α, the peculiar delay value may also be used for adjustment of the output timing of the first signal FS. For example, if it is assumed that the connection 50 is located at the terminal end on the external device 100 side, the receiving device 1 may output the first signal FS while advancing the phase by a half of the peculiar delay value. Therefore, since the receiving device 1 outputs the first signal FS from which the delay due to the first transmission line 41 from the output part 3 to the external device 100 is offset, it can obtain a timing closer to the reference time when the external device 100 utilizes the reference signal.

Note that, although in FIG. 9 the detector 19 performs the detection processing at two timings (the upstream timing Ta and the downstream timing Tb) corresponding to the both boundaries of the threshold range α, the timings at which the detection processing is performed are not limited to these timings.

For example, the detector 19 may perform the detection processing at three or more timings defined beforehand in one cycle of the reference signal (for example, a period from the time n to the time n+1), instead of the threshold range α. This is described with reference to FIG. 10.

Figure 10:
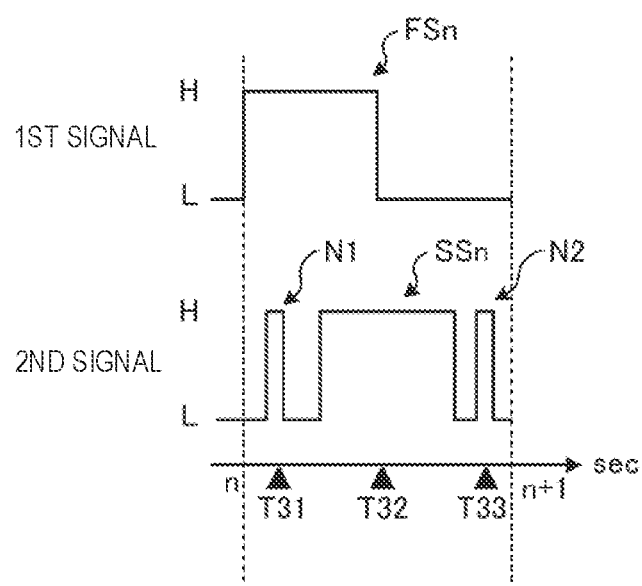
FIG. 10 is a view illustrating one example of the detection processing of the abnormality being performed by the detector at three timings.

FIG. 10 is a view illustrating one example of the detection processing of the abnormality being performed by the detector 19 at three timings. As illustrated in FIG. 10, the detector 19 may perform the detection processing of the abnormality at three timings T31, T32, and T33 during a period from the time n to the time n+1, which corresponds to one cycle of the reference signal. That is, the detector 19 may read the phase difference from the comparer 17 at the three timings T31, T32, and T33.

In the example illustrated in FIG. 10, the phase difference read at the timing T31 becomes a phase difference between the first signal FSn and noise N1. Here, if the noise N1 is not mixed, the phase difference read at the timing T31 may become a phase difference between the first signal FSn and the second signal SS which is of one cycle before. Therefore, the detector 19 may detect the mixing of the noise N1, when the phase difference read at the timing T31 becomes a value different from the phase difference between the first signal FSn and the second signal SS which is of one cycle before. That is, the detector 19 can detect the mixing of the noise N1 early at the timing T31.

Further, in the example illustrated in FIG. 10, the phase difference read at the timing T33 becomes a phase difference between the first signal FSn and noise N2. Here, if the noise N2 is not mixed, the phase difference read at the timing T33 may become a phase difference between the first signal FSn and the second signal SSn (the same as the phase difference at the timing T32). Therefore, the detector 19 may detect the mixing of the noise N2, when the phase difference read at the timing T33 which is a timing after the input of the second signal SSn becomes a value different from the phase difference between the first signal FSn and the second signal SSn. That is, the detector 19 can detect the mixing of the noise N2 early at the timing T33.

Therefore, the detector 19 can detect the abnormality, such as the noise mixing, earlier than in the case where the detection processing is performed at two timings (the upstream timing Ta and the downstream timing Tb) as described above.

Note that, although in FIG. 10 the detection processing is performed at the three timings T31, T32, and T33, the detector 19 may perform the detection processing at four or more timings, such as performing the detection processing every 10 msec, for example.

Further, although in the case described above the detector 19 detects the abnormality related to the reference signal by comparing the signal characteristic between the first signal FS and the second signal SS, it may detect the abnormality related to the reference signal only based on the signal characteristic of the second signal SS, without using the first signal FS, for example.

For example, the detector 19 may detect the abnormality related to the reference signal after the output (the second signal SS), when the cycle of the second signal SS is temporarily disturbed by the mixing of the noise. Further, the detector 19 may detect the abnormality related to the reference signal after the output, when the input of the second signal SS is stopped. That is, the detector 19 may detect the abnormality related to the reference signal based on the signal characteristic of the second signal SS.

Figure 11:
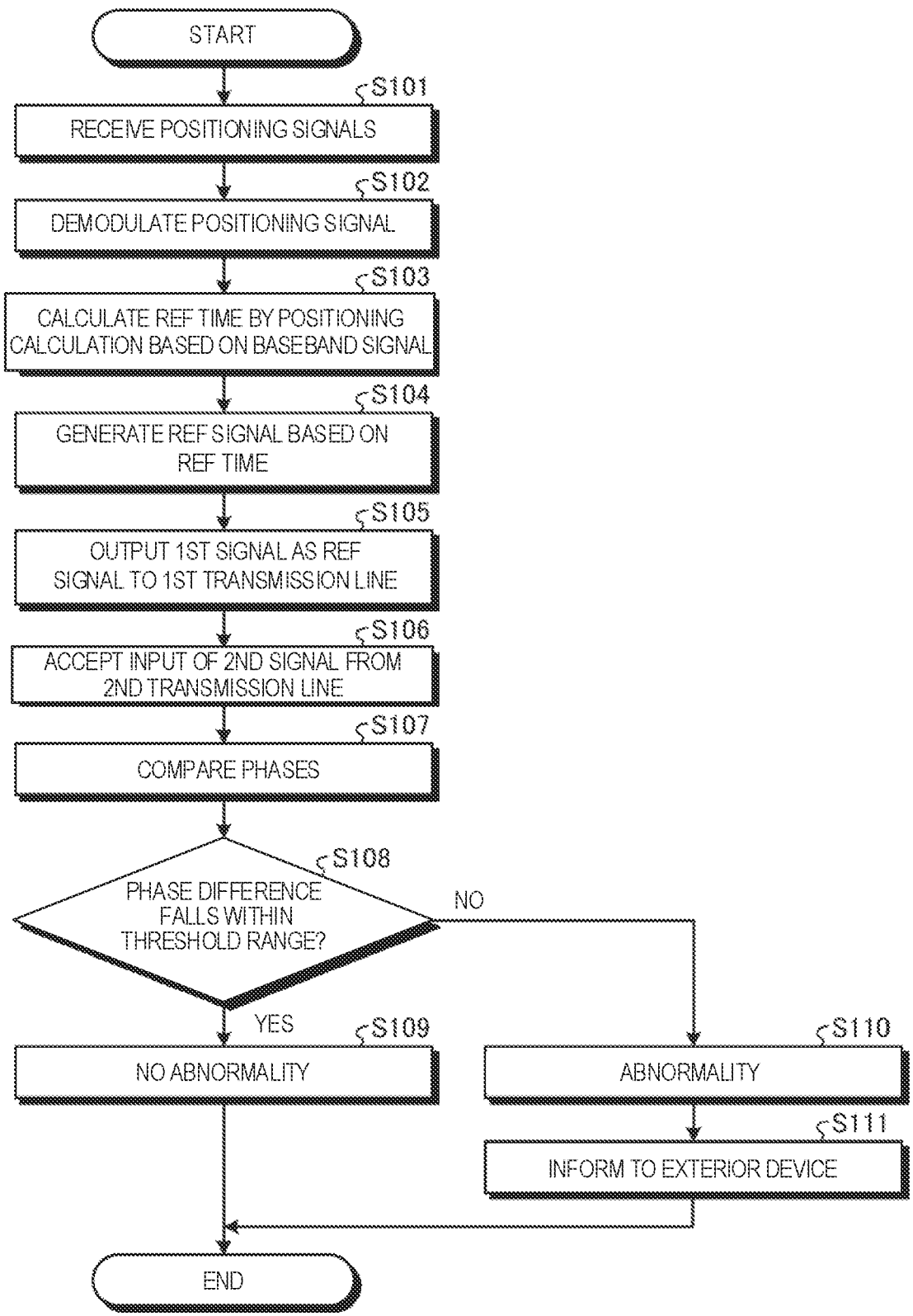
FIG. 11 is a flowchart illustrating a procedure of the detection processing of the abnormality performed by the receiving device according to this embodiment.
Figure 12:
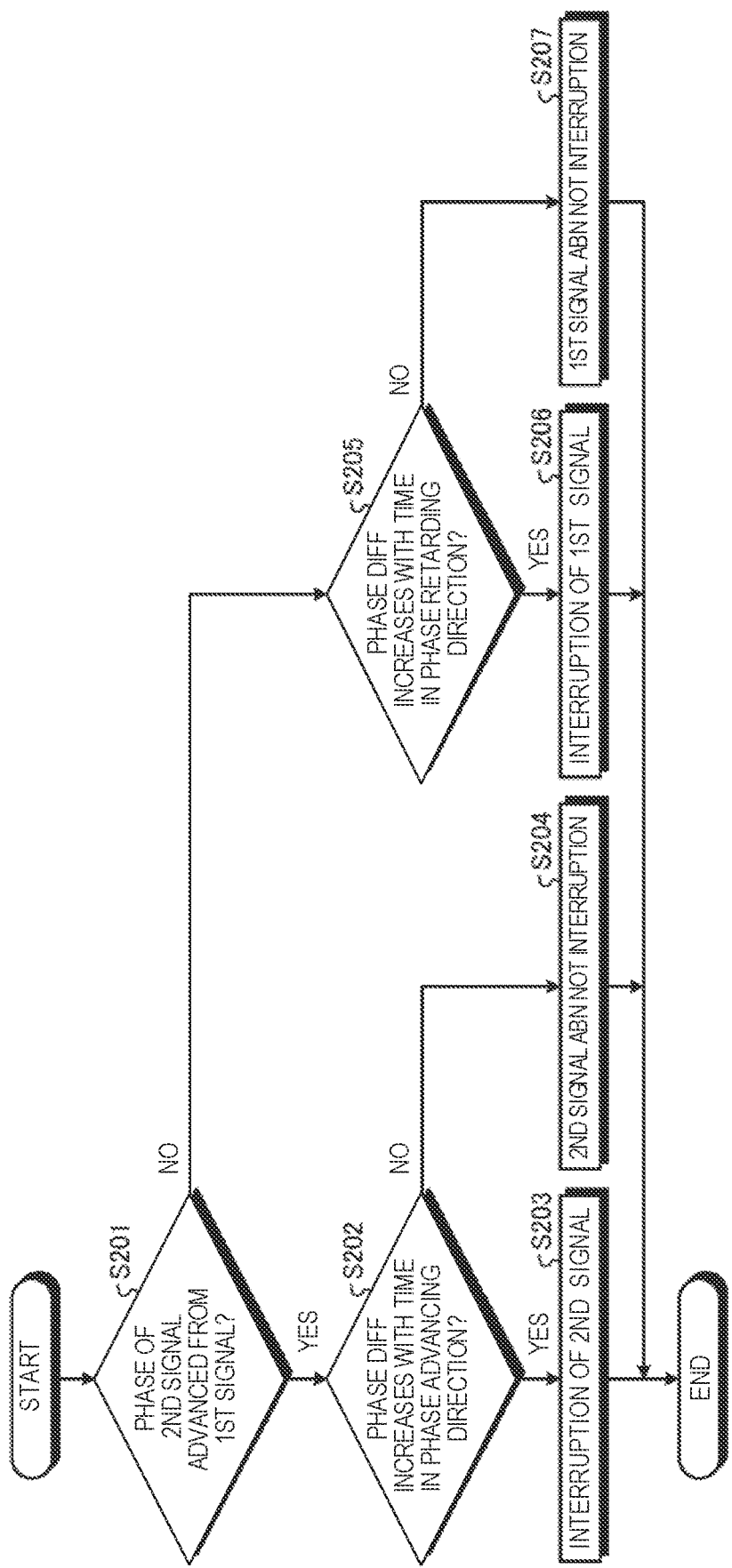
FIG. 12 is a flowchart illustrating a procedure of identification processing (#1) of the abnormality performed by the receiving device according to this embodiment.
Figure 13:
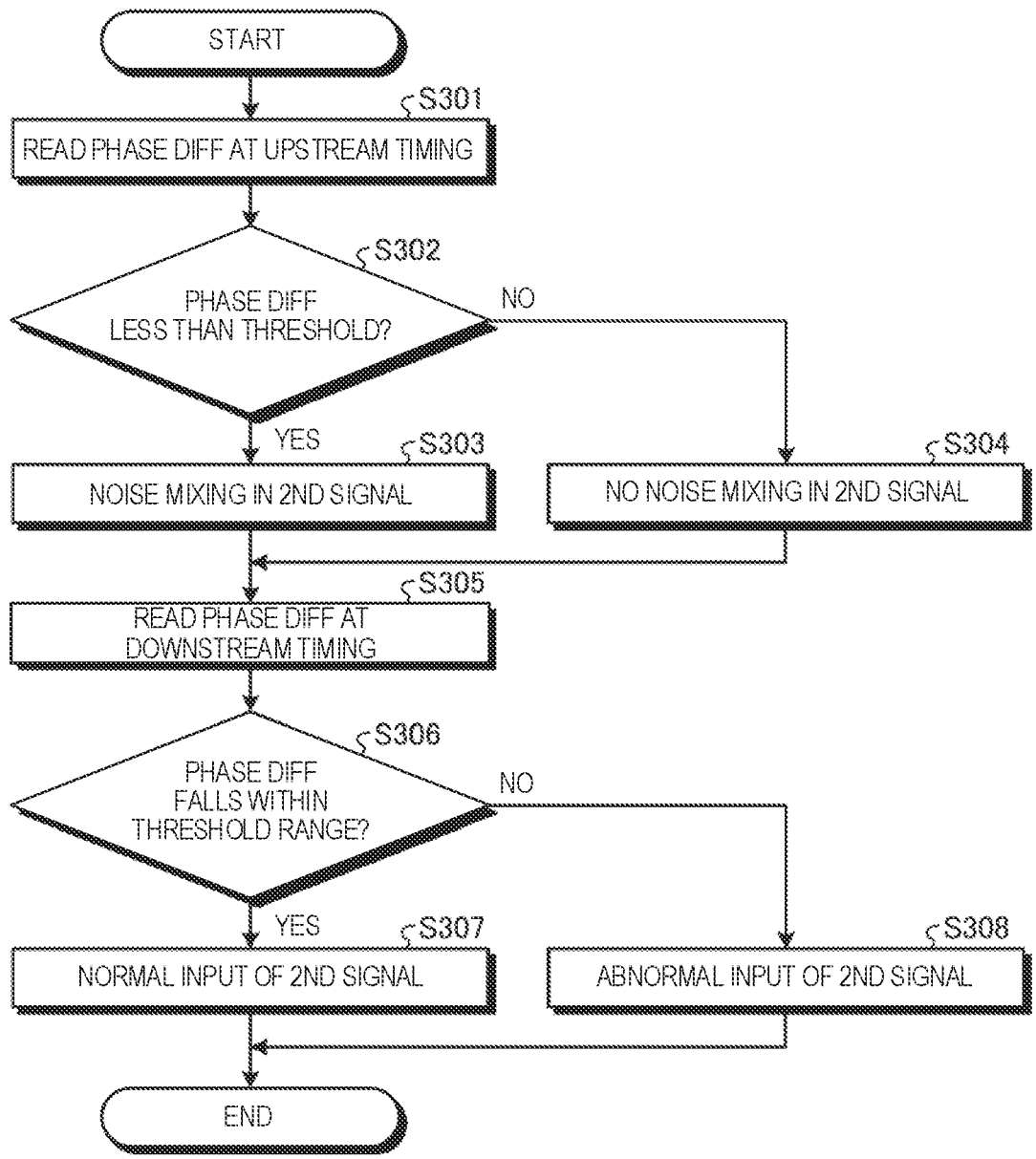
FIG. 13 is a flowchart illustrating a procedure of the identification processing (#2) of the abnormality performed by the receiving device according to this embodiment.

Next, procedures of processings performed by the receiving device 1 according to this embodiment will be described with reference to FIGS. 11 to 13. FIG. 11 is a flowchart illustrating a procedure of the detection processing of the abnormality performed by the receiving device 1 according to this embodiment. FIG. 12 is a flowchart illustrating a procedure of identification processing (#1) of the abnormality performed by the receiving device 1 according to this embodiment. FIG. 13 is a flowchart illustrating a procedure of the identification processing (#2) of the abnormality performed by the receiving device 1 according to this embodiment.

First, the procedure of the abnormality detection processing is described with reference to FIG. 11.

As illustrated in FIG. 11, the receiving part 2 may first receive the positioning signals (Step S101). Next, the downconverter 13 and the baseband processor 14 may demodulate the positioning signals (Step S102).

Next, the positioning calculator 15 may calculate the reference time by performing the positioning calculation based on the baseband signal acquired by the demodulation (Step S103). Next, the generator 16 may generate the reference signal based on the calculated reference time (Step S104).

Next, the output part 3 may output the first signal FS which is the generated reference signal to the first transmission line 41 which is connected to the external device 100 (Step S105). Next, the input part 4 may accept from the external device the input of the second signal SS which is the returning signal of the first signal FS of the first transmission line 41 from the external device 100 side via the second transmission line 42 (Step S106).

Next, the comparer 17 may compare the phase between the first signal FS and the second signal SS (Step S107). Next, the detector 19 may determine whether the phase difference which is the comparison result of the comparer 17 falls within the threshold range α defined beforehand (Step S108).

If the phase difference falls within the threshold range α (Step S108: Yes), the detector 19 may determine that there is no abnormality related to the reference signal (Step S109), and end this processing.

On the other hand, if the phase difference does not fall within the threshold range α (Step S108: No), the detector 19 may determine that there is the abnormality related to the reference signal (Step S110). Next, if the abnormality is detected by the detector 19, the informer 20 may inform the abnormality information on the abnormality to the exterior device (external device 100) (Step S111), and end this processing.

Next, the procedure of the abnormality identification processing (#1) is described with reference to FIG. 12. The abnormality identification processing illustrated in FIG. 12 may be performed after Step S110 in the abnormality detection processing illustrated in FIG. 11.

As illustrated in FIG. 12, if the abnormality is detected, the detector 19 may determine whether the phase of the second signal SS is advanced from the first signal FS (Step S201).

If the phase of the second signal SS is advanced from the first signal FS (Step S201: Yes), the detector 19 may determine whether the phase difference increases with time in the phase advancing direction (toward upstream) (Step S202).

If the phase difference increases with time in the phase advancing direction (Step S202: Yes), the detector 19 may identify that it is the interruption of the second signal SS (Step S203), and end this processing.

On the other hand, if the phase difference does not increase with time in the phase advancing direction (Step S202: No), the detector 19 may identify that it is the abnormality of the second signal SS other than the interruption (Step S204), and end this processing. The abnormality of the second signal SS other than the interruption may be the noise mixing, the temporary interruption, etc., for example.

Further, at Step S201, if the phase of the second signal SS is retarded from the first signal FS (Step S201: No), the detector 19 may determine whether the phase difference increases with time in the phase retarding direction (toward downstream) (Step S205).

If the phase difference increases with time in the phase retarding direction (Step S205: Yes), the detector 19 may identify that it is the interruption of the first signal FS (Step S206), and end this processing.

On the other hand, if the phase difference does not increase with time in the phase retarding direction (Step S205: No), the detector 19 may identify that it is the abnormality of the first signal FS other than the interruption (Step S207), and end this processing. The abnormality of the first signal FS other than the interruption may be the noise mixing, the temporary interruption, etc., for example.

Next, the procedure of the abnormality identification processing (#2) is described with reference to FIG. 13. The abnormality identification processing illustrated in FIG. 13 may be performed instead of, or in parallel with, the processing at and after Step S107 in the abnormality detection processing illustrated in FIG. 11.

As illustrated in FIG. 13, the detector 19 may read the phase difference which is the comparison result of the comparer 17 at the upstream timing Ta (Step S301). Next, the detector 19 may determine whether the read phase difference is less than the threshold defined beforehand (Step S302).

If the phase difference is less than the threshold (Step S302: Yes), the detector 19 may identify that the second signal SS encountered the noise mixing (Step S303). On the other hand, if the phase difference is equal to or more than the threshold (Step S302: No), the detector 19 may identify that there is no noise mixing in the second signal SS (Step S304).

Next, the detector 19 may read the phase difference which is the comparison result of the comparer 17 at the downstream timing Tb (Step S305). Next, the detector 19 may determine whether the read phase difference falls within the threshold range α defined beforehand (Step S306).

If the phase difference falls within the threshold range α (Step S306: Yes), the detector 19 may identify that the input of the second signal SS into the comparer 17 is normal (Step S307), and end this processing.

On the other hand, if the phase difference does not fall within the threshold range α (Step S306: No), the detector 19 may identify that the input of the second signal SS into the comparer 17 is abnormal (interrupted) (Step S308), and end this processing.

As described above, according to one embodiment of the present disclosure, the receiving device 1 may include the output part 3, the input part 4, and the detector 19. The output part 3 may output the first signal FS which is the periodical reference signal generated based on the positioning signal to the first transmission line 41 which is connected to the external device 100. The input part 4 may accept the input of the second signal SS which is the returning signal of the first signal of the first transmission line 41 from the external device 100 side via the second transmission line 42. The detector 19 may detect the abnormality related to the reference signal based on the signal characteristic of the second signal SS. Therefore, the receiving device 1 can detect the abnormality related to the reference signal after the output (the second signal SS).

Figure 14:
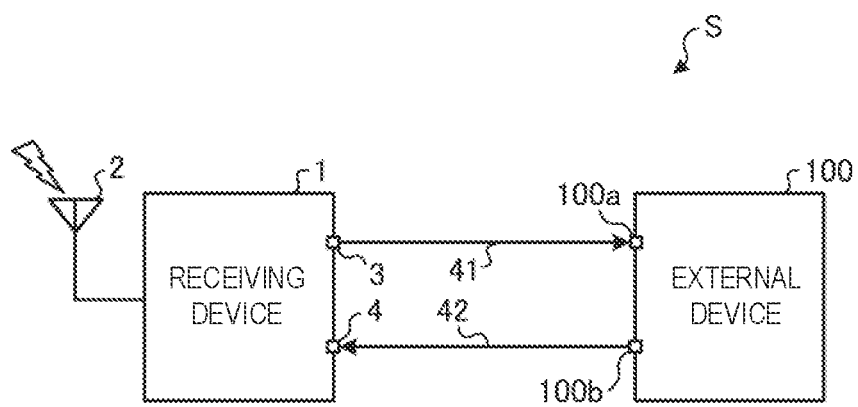
FIG. 14 is a view illustrating one example of a configuration of a receiving system according to a modification.

Note that, in the above embodiment, the input part 4 may accept the input of the second signal SS from the second transmission line 42 which is connected to the first transmission line 41 at the terminal end on the external device 100 side. Alternatively, for example, the input part 4 may be configured as illustrated in FIG. 14, as long as it accepts the input of the second signal SS which is the returning signal of the first signal FS of the first transmission line 41 from the external device 100 side via the second transmission line 42.

Here, another example of the configuration of the receiving system S is described with reference to FIG. 14. FIG. 14 is a view illustrating one example of the configuration of the receiving system S according to a modification. In FIG. 14, the input part 4 may accept the input of the second signal from the external device 100 connected to the second transmission line 42. In detail, as illustrated in FIG. 14, the first transmission line 41 may be connected to the output part 3 of the receiving device 1, and an input terminal 100a of the external device 100. Further, the second transmission line 42 may be connected to the input part 4 of the receiving device 1, and an output terminal 100b of the external device 100. That is, the first transmission line 41 and the second transmission line 42 may connect the receiving device 1 to the external device 100 in the mutually-independent state.

According to such a configuration, the output part 3 of the receiving device 1 may output the first signal FS to the first transmission line 41. Therefore, the reference signal may be inputted into the external device 100 via the input terminal 100a. Further, the external device 100 may output the first signal FS which is the reference signal inputted into the input terminal 100a from the output terminal 100b to the second transmission line 42. Therefore, the second signal SS which is the first signal FS outputted from the external device 100 may be inputted into the input part 4 of the receiving device 1 from the second transmission line 42.

Thus, by the receiving device 1 according to the modification, since the first signal FS once inputted into the external device 100 via the first transmission line 41 is inputted as the second signal SS, the abnormality which is caused in the entire first transmission line 41 can be detected.

Although in the above embodiments the receiving device 1 includes the comparer 17, the estimator 18, the detector 19, and the informer 20 therein, at least one of the comparer 17, the estimator 18, the detector 19, and the informer 20 may be connected with the receiving device 1 externally, for example. For example, a reference signal generator may be configured so that at least one of the comparer 17, the estimator 18, the detector 19, and the informer 20 is connected with the receiving device 1 externally.

Further, among each processing described in the above embodiments, all or a part of the processing which is performed automatically may also be performed manually, or all or a part of the processing which is performed manually may also be performed automatically using a known method. Moreover, the above processing procedures, the concrete names, the information including various kinds of data and parameters as described and illustrated in the document and the drawings may be changed arbitrarily unless otherwise particularly indicated. For example, the variety of information illustrated in each drawing are not limited to the illustrated information.

Further, each component of each illustrated device is a functional concept, and is not necessarily required to be physically configured as illustrated. That is, the concrete forms of distribution and integration of the devices are not limited to those illustrated, and all or a part thereof may be configured by distributing and/or integrating functionally or physically per arbitrary unit, according to various kinds of loads, status of use, etc.

Further, the present disclosure is not limited to the above embodiments, and various changes are possible within the scope described in the appended claims. For example, a form acquired by suitably combining the above embodiments within a range where the processings occur contradictorily is also encompassed within the technical scope of the present disclosure. Moreover, steps illustrated in the above flowcharts and sequence diagrams of the above embodiments may be suitably changed in the order.

[Terminology]

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A receiving device, comprising:
   an output part configured to output a first signal that is a periodic reference signal generated based on a positioning signal to a first transmission line connected to an external device;
   an input part configured to accept an input of a second signal that is a returning signal of the first signal of the first transmission line from the external device side via a second transmission line; and
   processing circuitry configured to:
   detect an abnormality related to the reference signal based on a signal characteristic of the second signal by comparing a phase of the first signal with a phase of the second signal, wherein the processing circuitry detects the abnormality when a phase difference between the first signal and the second signal does not fall within a threshold range defined beforehand; and
   one of the following:
   identify that the abnormality is an interruption of the second signal, when the phase of the second signal is advanced from the phase of the first signal, and when the phase difference increases with time, or
   identify that the abnormality is an interruption of the first signal, when the phase of the second signal is retarded from the phase of the first signal, and when the phase difference increases with time.

2. The receiving device of claim 1, wherein the input part accepts the input of the second signal from the second transmission line connected to the first transmission line at a terminal end on the external device side.

3. The receiving device of claim 1, wherein the input part accepts the input of the second signal from the external device connected to the second transmission line.

4. The receiving device of claim 1, wherein the processing circuitry identifies that the abnormality is the interruption of the second signal, when the phase of the second signal is advanced from the phase of the first signal, and when the phase difference increases with time.

5. The receiving device of claim 4, wherein
   the processing circuitry is further configured:
   to estimate a peculiar delay value of the second signal with respect to the first signal based on the phase difference,
   wherein the processing circuitry sets the threshold range so as to include the peculiar delay value.

6. The receiving device of claim 4, wherein the processing circuitry performs the detection processing of the abnormality at an upstream timing corresponding to an upstream boundary of the threshold range, and when the phase difference at the upstream timing is less than a threshold defined beforehand, the processing circuitry identifies that the abnormality is noise mixing in the second signal.

7. The receiving device of claim 1, wherein the processing circuitry identifies that the abnormality is the interruption of the first signal, when the phase of the second signal is retarded from the phase of the first signal, and when the phase difference increases with time.

8. The receiving device of claim 7, wherein
   the processing circuitry is further configured:
   to estimate a peculiar delay value of the second signal with respect to the first signal based on the phase difference,
   wherein the processing circuitry sets the threshold range so as to include the peculiar delay value.

9. The receiving device of claim 7, wherein the processing circuitry performs the detection processing of the abnormality at an upstream timing corresponding to an upstream boundary of the threshold range, and when the phase difference at the upstream timing is less than a threshold defined beforehand, the processing circuitry identifies that the abnormality is noise mixing in the second signal.

10. The receiving device of claim 1, wherein
    the processing circuitry is further configured:
    to estimate a peculiar delay value of the second signal with respect to the first signal based on the phase difference,
    wherein the processing circuitry sets the threshold range so as to include the peculiar delay value.

11. The receiving device of claim 10, wherein the processing circuitry performs the detection processing of the abnormality at an upstream timing corresponding to an upstream boundary of the threshold range, and when the phase difference at the upstream timing is less than a threshold defined beforehand, the processing circuitry identifies that the abnormality is noise mixing in the second signal.

12. The receiving device of claim 1, wherein the processing circuitry performs the detection processing of the abnormality at an upstream timing corresponding to an upstream boundary of the threshold range, and when the phase difference at the upstream timing is less than a threshold defined beforehand, the processing circuitry identifies that the abnormality is noise mixing in the second signal.

13. The receiving device of claim 1, wherein the processing circuitry performs the detection processing of the abnormality at a downstream timing corresponding to a downstream boundary of the threshold range, and when the phase difference at the downstream timing does not fall within the threshold range, the processing circuitry identifies that the abnormality is an interruption of the second signal.

14. The receiving device of claim 1, wherein the processing circuitry performs the detection processing of the abnormality at three or more timings set at an interval defined beforehand in one cycle of the reference signal.

15. The receiving device of claim 1, wherein the input part accepts the input of the second signal from the second transmission line connected to the first transmission line at a terminal end on the external device side.

16. The receiving device of claim 1, wherein the input part accepts the input of the second signal from the external device connected to the second transmission line.

17. An abnormality detecting method, comprising the steps of:
outputting a first signal that is a periodical reference signal generated based on a positioning signal to a first transmission line connected to an external device;
accepting an input of a second signal that is a returning signal of the first signal of the first transmission line from the external device side via a second transmission line;
detecting an abnormality related to the reference signal based on a signal characteristic of the second signal by comparing a phase of the first signal with a phase of the second signal, wherein the detecting detects the abnormality when a phase difference between the first signal and the second signal does not fall within a threshold range defined beforehand; and
identifying one of the following:
that the abnormality is an interruption of the second signal, when the phase of the second signal is advanced from the phase of the first signal, and when the phase difference increases with time, or
that the abnormality is an interruption of the first signal, when the phase of the second signal is retarded from the phase of the first signal, and when the phase difference increases with time.

18. The abnormality detecting method of claim 17, wherein the identifying identifies that the abnormality is the interruption of the second signal, when the phase of the second signal is advanced from the phase of the first signal, and when the phase difference increases with time.

19. The abnormality detecting method of claim 17, wherein the identifying identifies that the abnormality is the interruption of the first signal, when the phase of the second signal is retarded from the phase of the first signal, and when the phase difference increases with time.

20. A non-transitory computer-readable storage medium having stored thereon machine-readable instructions that, when executed by one or more processors of an apparatus, cause the apparatus to perform a method comprising:
outputting a first signal that is a periodical reference signal generated based on a positioning signal to a first transmission line connected to an external device;
accepting an input of a second signal that is a returning signal of the first signal of the first transmission line from the external device side via a second transmission line;
detecting an abnormality related to the reference signal based on a signal characteristic of the second signal by comparing a phase of the first signal with a phase of the second signal, wherein the detecting detects the abnormality when a phase difference between the first signal and the second signal does not fall within a threshold range defined beforehand; and
identifying one of the following:
that the abnormality is an interruption of the second signal, when the phase of the second signal is advanced from the phase of the first signal, and when the phase difference increases with time, or
that the abnormality is an interruption of the first signal, when the phase of the second signal is retarded from the phase of the first signal, and when the phase difference increases with time.

21. The non-transitory computer-readable storage medium of claim 20, wherein the identifying identifies that the abnormality is the interruption of the second signal, when the phase of the second signal is advanced from the phase of the first signal, and when the phase difference increases with time.

22. The non-transitory computer-readable storage medium of claim 20, wherein the identifying identifies that the abnormality is the interruption of the first signal, when the phase of the second signal is retarded from the phase of the first signal, and when the phase difference increases with time.

* * * * *